April 17, 1962
SOICHI ODA ETAL
3,030,568
SELF-EXCITED COMPOUND ALTERNATOR
Filed May 12, 1959
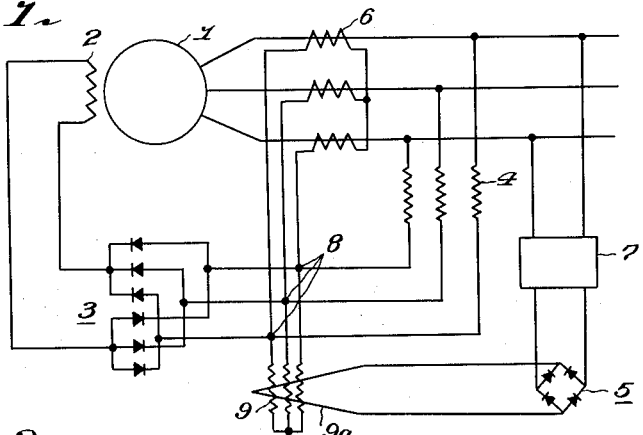
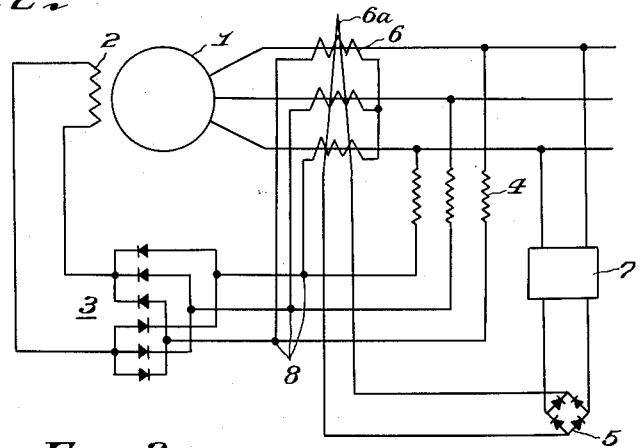
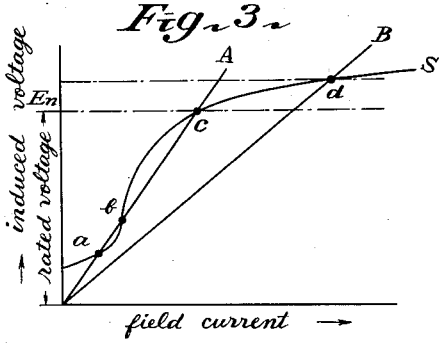
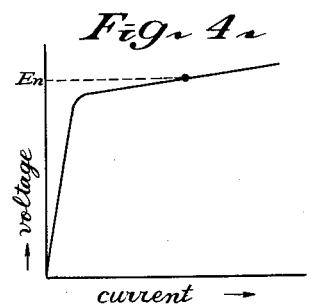
SOICHI ODA
MASAO KAMURA
INVENTORS.
BY
Karl F. Ross
Agent United States Patent Office 3,030,568
Patented Apr. 17, 1962

3,030,568
SELF-EXCITED COMPOUND ALTERNATOR
Soichi Oda, Tokyo-to, and Masao Kamura, Yokohama-shi, Japan, assignors to Kabushiki Kaisha Meidensha (known as Meidensha Electric Mfg. Co., Ltd.), Tokyo-to, Japan
Filed May 12, 1959, Ser. No. 812,708
Claims priority, application Japan May 16, 1958
2 Claims. (Cl. 522—25)

The present invention relates to a self-excited compound alternator having a compound characteristic, and more particularly to an improvement of the self-excited compound alternator, in which the field winding of the alternator is excited, through a rectifier set, by the secondary current of a current transformer connected to the output side of the alternator and by the output current of an air gap type reactor connected to the output terminals of the alternator, and in which said current transformer is provided with a direct current exciting winding connected to said output terminals through a voltage detector and a rectifier set, said exciting winding being used to compensate the no load characteristic of the alternator.

An important object of the present invention is to provide an improved alternator of the type as described above, in which the current transformer is of relatively small type and has no difficult problem in connection with its electrical insulation.

Another object of the present invention is to provide an improved alternator of the type as described above, in which compensation of the field current of the alternator by the current transformer, no load voltage maintenance and compensation of over or insufficient field current compensation can be achieved independently.

A further object of the present invention is to provide an improved alternator of the type as described above, in which change of the no load rated voltage can be easily achieved and any undesirable effect is not given to the current transformer.

Said objects and the other objects of the present invention have been attained by a self-excited compound alternator comprising a separated field winding, a current transformer connected to the output side of the alternator, and a reactor of air gap type, said current transformer supplying said field winding with a direct current being in proportion to the output current of the alternator through a rectifier set and said reactor being connected to the output terminals of the alternator and supplying said field winding with a direct current being in proportion to the output voltage of the alternator through said rectifier set, characterized by that the alternator is provided with a separated saturatable reactor which is connected to the input terminals of said rectifier set and which is provided with a direct current exciting winding connected to the output terminals of the alternator through a voltage detector and rectifier set.

The novel features which we believe to be characteristic of the present invention are set forth with particularity in the appended claim. Our invention itself, however, both as to its operation and construction, together with further objects and advantages thereof, may best be understood by reference to the following description, taken in connection with the accompanying drawing, in which the same members are indicated by the same numerals, and in which:

FIG. 1 is a diagrammatic connection view of one embodiment of the present invention;

FIG. 2 is a diagrammatic connection view of the conventional self-excited compound alternator corresponding to the alternator illustrated in FIG. 2;

FIG. 3 shows the characteristic curves for describing the principle of the present invention;

FIG. 4 is a voltage-current characteristic curve of a voltage detector having a sudden saturation character.

Hitherto, the conventional self-excited compound alternator provided with no exciter has been so embodied as shown in FIG. 2, in which the self-excited compound alternator comprises a three phase armature 1 and a separated field winding 2 which is connected to the output terminals of the alternator through a three phase reactor 4 of air gap type and a rectifier set 3, whereby the field winding 2 is made to be excited by a direct current being in proportion to the output voltage of the alternator. Furthermore, the field winding 2 is connected to the secondary windings of a three phase current transformer 6 through the rectifier set 3, said current transformer being excited by the output currents of the alternator, whereby the field winding 2 is also made to be excited by a direct current being in proportion to the output currents of the alternator.

The current transformer 6 is provided with a direct current exciting winding 6a which is supplied with the output current of a voltage detector 7 through another rectifier set 5, said detector being connected at its input side to the output side of the alternator.

The operation of the alternator illustrated in FIG. 2 is as follows.

Upon starting of the alternator, a certain electric voltage is induced by any residual magnetism thereof and then this induced voltage is fed back successively to the field winding 2 through the reactor 4 and rectifier set 3, whereby a no load output voltage of the alternator is established. However, correct establishment of the output electric voltage of the alternator depends upon the fact whether the cross point of the field-impedance characteristic line and the no load saturation curve is stable or not.

Accordingly, if, as shown in FIG. 3, the field-impedance characteristic line is so selected as to coincide with the line A, said line A crosses the no load saturation curve S at the points a, b and c. Accordingly, the output voltage of the alternator would not be raised above the voltage corresponding to the cross point a, thus missing establishment of higher rated no load output voltage. On the other hand, if the field-impedance characteristic line is so selected as to coincide with the line B which crosses the no load saturation curve S at only one point d, the output voltage of the alternator increases to the voltage corresponding to the point d, thus establishing an output voltage of the alternator.

However, since the point d corresponds to a higher output voltage than the rated no load voltage $E_n$, the characteristic line B must be shifted toward the line A. Now, when the voltage detector 7 is so designed that voltage-current characteristic of said detector may become as shown in FIG. 4, the current supplied from the detector 7 to the exciting winding 6a of the current transformer 6 is almost zero as far as the exciting current of the field winding 2 is small, that is to say, the output voltage of the alternator is low. Accordingly, if the resultant impedance of the reactor 4 and the resistance of the field winding 2 is designed so as to be equal to the characteristic line B, the output voltage of the alternator increases gradually to the voltage corresponding to the point d in FIG. 3. Upon reaching of the output voltage of the alternator to about the rated voltage, the current supplied to the exciting winding 6a through the detector 7 increases suddenly, as will be understood from FIG. 4, whereby the saturatable current transformer 6 is somewhat saturated and the impedance thereof reduces. Accordingly, a part of the current supplied to the field winding 2 through the reactor 4 is bypassed through the current transformer 6, whereby the characteristic line B is shifted toward the characteristic line A and the alternator is balanced at the rated voltage E$n$.

However, in the above-mentioned self-excited compound alternator, there are the following disadvantages.

(a) Since the saturatable current transformer 6 is provided with the direct current exciting winding 6a besides the primary and secondary windings thereof, difficult problem occurs from the electrical insulation point of view.

(b) A current transformer of two core type must be used as the current transformer 6 in order to suppress the mutual induction between the winding 6a and the main windings of the current transformer 6.

(c) A current transformer of large capacity must be used as the current transformer 6, because said transformer must have a function of establishing the no load voltage and a function of compensating the field current, and accordingly, the voltage detector 7 also becomes large type. Moreover, these two kinds of functions cannot be adjusted independently.

According to the present invention, the above-mentioned disadvantages have been eliminated by adopting the self-excited compound alternator as illustrated in FIG. 1, said alternator being almost equal to the alternator of FIG. 2 except that in the former, the direct current exciting winding 6a is provided at a separated saturatable reactor 9 connected to the junction points 8 at the input side of the rectifier set 3.

According to the alternator as illustrated in FIG. 1, since the saturatable reactor 9 is separated from the current transformer, the electrical insulation problem at the current transformer 6 would not occur and the current transformer 6 becomes relatively small type, because it can be constructed as the single core type transformer. Furthermore, since the current transformer 6 functions to compensate the current of the field winding 2 and the saturatable reactor 9 functions to maintain the no load rated voltage and to compensate over or insufficient current compensation, said functions can be adjusted independently, moreover, in the conventional self-excited compound alternator as shown in FIG. 2, since the current transformation ratio between the primary and secondary windings varies with the variation of the exciting direct current in the winding 6a, the compensation of the current supplied to the field winding 2 is definitely determined in accordance with the variation of the exciting direct current in the winding 6a, thus causing difficulty of change of the no load rated voltage. However, according to the self-excited compound alternator as illustrated in FIG. 1, since the current transformer 6 is not affected by the exciting direct current and the compensation of the field current in the loaded state can be achieved by variation of winding turn ratio of the current transformer, change of no load rated voltage becomes very easy and any undesirable effect would not be given to the current transformer.

What we claim is:

1. A regulating system for a self-excited alternating-current generator, comprising a field winding for said generator, a current transformer in the output of said generator provided with secondary-winding means adapted to develop a control voltage proportional to the output current of the generator, first rectifier means connected between said secondary-winding means and said field winding for energizing the latter by said control voltage, a saturable reactor connected to said first rectifier means in parallel with said secondary-winding means, said reactor being provided with a biasing winding, a supply circuit for said biasing winding connected to be energized by the output voltage of the generator, second rectifier means in said supply circuit for deriving from said output voltage a direct biasing current for sufficiently saturating said reactor and lowering its impedance, upon said output voltage reaching a predetermined value, so as to draw an appreciable part of the current from said secondary-winding means through said reactor, thereby weakening the energization of said field winding, non-linear impedance means in said supply circuit for effecting a sharp rise in said biasing current upon said output voltage approaching said predetermined value.

2. A system according to claim 1, further comprising a supplemental reactive circuit connected between the generator output and said first rectifier means, in parallel with said secondary-winding means and said saturable reactor, for additionally energizing said field winding by a current proportional to the output voltage of the generator.

References Cited in the file of this patent

UNITED STATES PATENTS

| 2,454,582 | Thompson et al. | Nov. 23, 1948 |
| 2,791,740 | McKenna et al. | May 7, 1957 |

FOREIGN PATENTS

| 199,275 | Austria | Aug. 25, 1958 |